March 21, 1961

H. H. WILDER 2,975,507

MILLING CUTTER

Filed July 10, 1958

INVENTOR.
HARVEY H. WILDER

BY Arthur H. Seidel

ATTORNEY

March 21, 1961     H. H. WILDER     2,975,507
MILLING CUTTER

Filed July 10, 1958     3 Sheets-Sheet 2

INVENTOR.
HARVEY H. WILDER
BY Arthur H. Seidel
ATTORNEY

March 21, 1961 H. H. WILDER 2,975,507
MILLING CUTTER

Filed July 10, 1958 3 Sheets-Sheet 3

INVENTOR.
HARVEY H. WILDER
BY Arthur H. Seidel
ATTORNEY

United States Patent Office 2,975,507
Patented Mar. 21, 1961

2,975,507
MILLING CUTTER
Harvey H. Wilder, Moorestown, N.J., assignor of fifty percent to E. Byron Nichols, Moorestown, N.J.

Filed July 10, 1958, Ser. No. 747,648

10 Claims. (Cl. 29—105)

This invention relates to a novel construction of a milling cutter and more particularly to the construction of a milling cutter having removable cutting teeth.

Heretofore in the inserted tooth type milling cutter, each cutting tooth was individually secured or clamped to the cutter head. Such cutters have many disadvantages. When the cutting teeth require sharpening it is a time consuming and tedious task to individually remove each tooth, sharpen it and replace it in the cutter head. In addition, it is difficult when replacing the teeth to properly align the teeth for proper cutting operation.

It is therefore an object of this invention to provide a milling cutter in which the cutting teeth can be quickly and easily removed and replaced.

It is another object of this invention to provide a milling cutter in which a single collet type clamping ring locks all the cutting teeth in the cutter head.

It is still another object of this invention to provide a milling cutter in which the teeth are wedge-shaped and co-act together to lock themselves within the cutter head.

It is a further object to provide an insertable tooth milling cutter in which all the teeth are substantially identical for ease of manufacture.

It is still a further object to provide an insertable tooth milling cutter, the teeth of which are constructed so that they can all be sharpened at one time.

Other objects of the invention will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Figure 1:
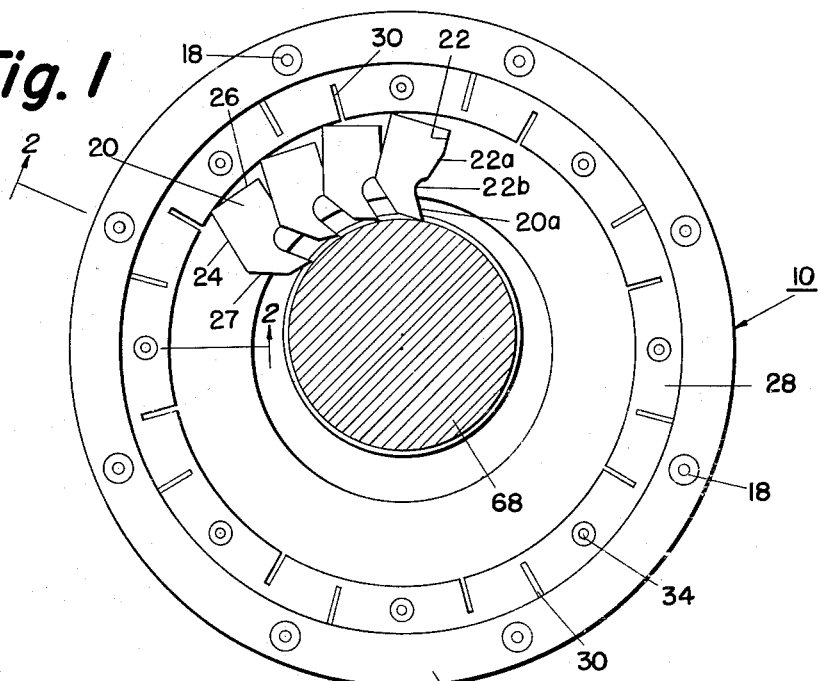
Figure 1 is a front elevation of the milling cutter of of this invention for milling external threads.
Figure 2:
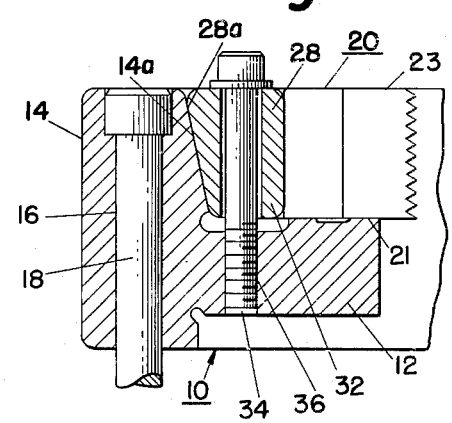
Figure 2 is a cross-sectional view of the milling cutter taken along line 2—2 of Figure 1.

Referring to Figures 1 and 2 of the drawing, the milling cutter of this invention comprises a cutter head 10 having a centrally apertured base 12 and an annular peripheral flange 14 projecting from the base. Flange 14 has a plurality of circumferentially-spaced holes 16 extending longitudinally therethrough. Bolts 18 extend through holes 16 to secure head 10 to a milling machine (not shown). The inner surface 14a of flange 14 is tapered radially inwardly toward the base 12 so that the flange is thinner at its end than it is adjacent the base 12. A plurality of substantially identical individual cutting teeth 20 are mounted within head flange 14 with one end 21 of each of the teeth 20 abutting against the head base 12 (see Figure 2). Although only a few of the teeth 20 are shown in detail the teeth 20 are arranged in a complete circle in a side-by-side contacting relation (see Figure 1) with the cutting edge 20a of each being on the inside of the circle. Each tooth 20 is substantially rectangular in shape having its end surfaces 21 and 23, its outer surface 26, and one side surface 24 all flat and at right angles to each other. The other side surface 22 has a portion 22a which tapers inwardly toward flat side 24 and ends at groove 22b which provides cutting edge 20a. The corner of tooth 20 between side 24 and the inner surface is chamfered at 27 to provide the necessary clearance between the cutting edges of adjacent cutting teeth 20. Tapered portion 22a serves a number of important functions. When the teeth 20 are arranged in side-by-side contacting relation, the flat side 24 of each tooth 20 engages the tapered portion 22a of the adjacent tooth. This causes each tooth to be angled with respect to the adjacent teeth and thereby automatically arranges the teeth 20 in a circle. Also, the angling of the teeth provides the necessary clearance angle for the cutting edge 20a. In addition, the tapered side 22a provides each tooth 20 with a wedge-shaped cross-section. Thus, when the teeth 20 are arranged in the circle, a force applied radially inwardly to the bottoms 26 of all the teeth 20 will cause the teeth to wedge tightly together and lock the teeth in place.

To apply the locking force to teeth 20 an annular clamping collet ring 28 fits around teeth 20 and within cutter head flange 14. The outer surface 28a of the clamping collet ring 28 is tapered to correspond with the tapered inner surface 12a of flange 14. Clamping ring 28 has a plurality of circumferentially spaced radially extending slots 30 extending alternately from its inner and outer surface to a point short of the opposite surface. Slots 30 overlap sufficiently to provide a clamping ring 28 with sufficient resiliency to permit it to be tightened against teeth 20. Clamping ring collet 28 is also provided with a plurality of longitudinally extending holes 32 circumferentially spaced around the ring. Screws 34 extend through holes 32 and are threaded into threaded holes 36 in head base 12. By threading screws 34 into holes 36 clamping ring 28 is pulled into head flange 14 where the engagement of its outer tapered surface 28a with the tapered surface 14a of head flange 14 causes the clamping ring 28 to be contracted against the bottoms 26 of teeth 20. Thus, clamping ring 28 applies a force onto teeth 20 which wedges the teeth tightly together and thereby clamps them within the head 10. If necessary, any portion of the circle of teeth may be quickly and easily adjusted to center by merely loosening or tightening, as the case may require, the screws 34 adjacent the teeth to move the teeth out or in to its proper position.

Figure 3:
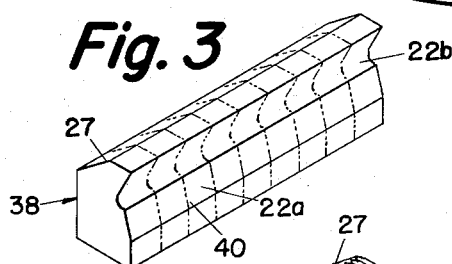
Figure 3 is a perspective view showing the method of making the cutting teeth.
Figure 4:
Figure 4 is a perspective view of the cutting teeth arranged for sharpening.
Figure 5:
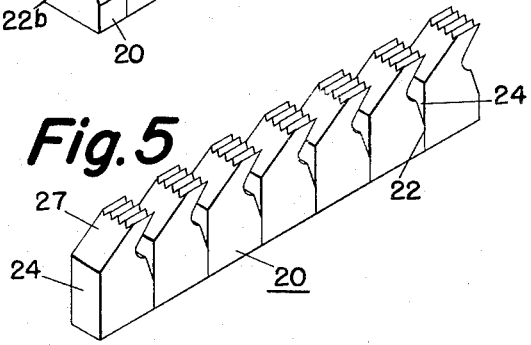
Figure 5 is a perspective view of the cutting teeth arranged for form grinding.

The shape of teeth 20 is not only important for the assembling and clamping of the teeth in head 10, but also provides teeth which can be easily and inexpensively manufactured and which can easily and quickly be resharpened when required. As shown in Figure 3, teeth 20 may be made from a rectangular bar 38 of tool steel stock. Bar 38 is machined to provide tapered portion 22a, groove 22b and chamfered corner 27 after which bar 38 may be hardened and cut into the proper lengths as indicated by broken lines 40 to provide the individual teeth 20. Whenever teeth 20 require sharpening it is only necessary to place the teeth in end-to-end alignment on a magnetic chuck or the like as shown in Figure 4 and all the grooves 22b will be in alignment so that by a single operation all the cutting edges 20a can be sharpened to the same degree. For use in milling threads the thread forming edges of the teeth are formed by merely turning the teeth 20 90° so that the flat side 24 of each tooth is seated against the parallel portion of side 22 of the adjacent teeth, as shown in Figure 5. Then in a single operation the thread forming edges can be machined and all to a uniform shape.

Figure 6:
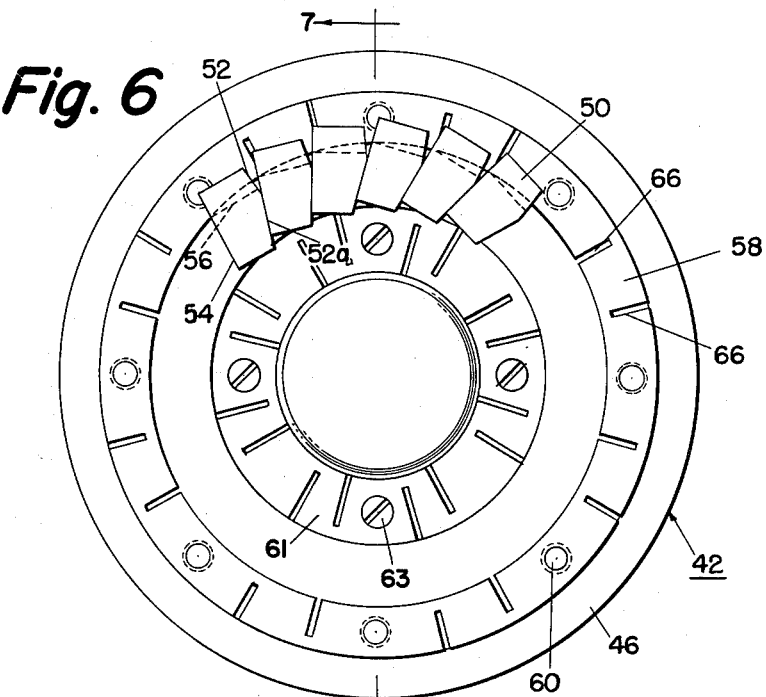
Figure 6 is a front elevation of a modification of the milling cutter for face milling.
Figure 7:
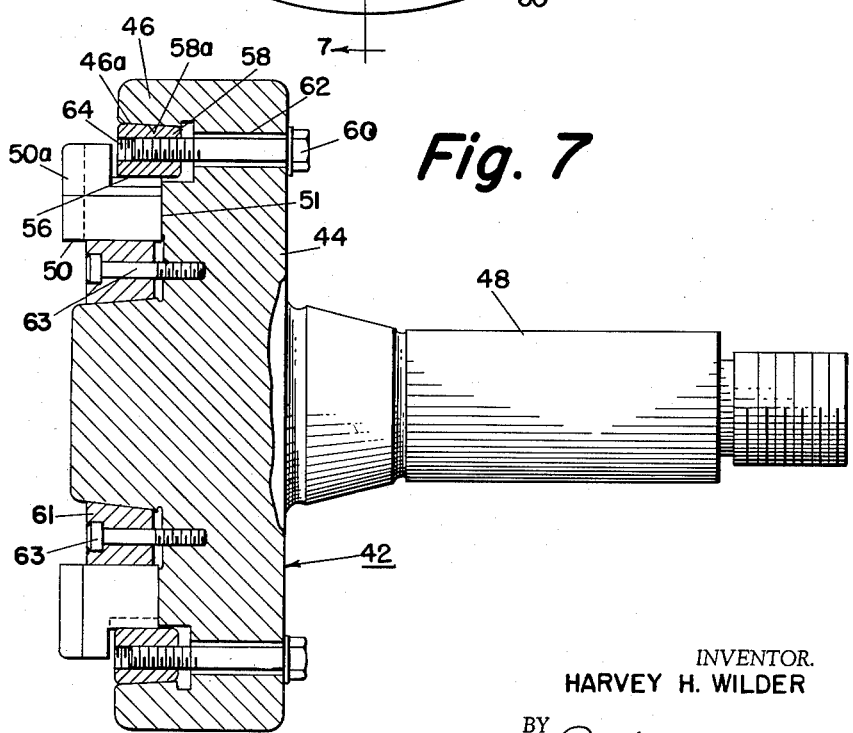
Figure 7 is a cross-sectional view of the modification of Figure 6 taken along line 7—7 of Figure 6.

Figures 6 and 7 show a modification of the milling cutter arranged for face milling. The face milling cutter comprises a head 42 having base 44 and an annular peripheral flange 46 projecting from one side of the base 44. A spindle 48 projects from the other side of base 44 to which head 42 is secured to a milling machine (not shown). Cutting teeth 50 are mounted within head flange 46 with one end 51 abutting against head base 44. Cutting teeth 50 are substantially the same as cutting teeth 20 of the modification of Figures 1 and 2 except that the cutting edge 50a is along the outer end of the tooth instead of along the inner surface thereof. However, each tooth 50 is substantially rectangular having end surface 51, outer surface 56 and one side 54 all flat and at right angles to each other. The other side surface 52 has the tapered portion 52a which provides the wedge-shaped cross-section and permits the teeth 50 to be easily arranged in a circle within head 42. Thus, teeth 50 can be made and sharpened in substantially the same manner as previously described with regard to teeth 20. Annular clamping collet ring 58 fits around teeth 50 and within head flange 46 and has a tapered outer surface 58a mating with the tapered inner surface 46a of flange 46. Circumferentially spaced screws 60 extend through holes 62 in head base 44 and are threaded into holes 64 in collet ring 58. Thus, by tightening screws 60, clamping ring 58 is drawn into head flange 46 and forced inwardly against the outer surfaces 56 of teeth 50 to wedge the teeth 50 tightly together within the head 42. Collet ring 58 is provided with radial slots 66 extending alternately from its inner and outer edges to provide clamping ring 58 with sufficient resiliency to permit it to contract against teeth 50. An annular back-up ring 61 is provided within the circle of cutting teeth 50 and is movable in or out to permit adjustment of the position of cutting teeth 50 by screws 63 which are threaded into cutter head base 44.

Figure 8:
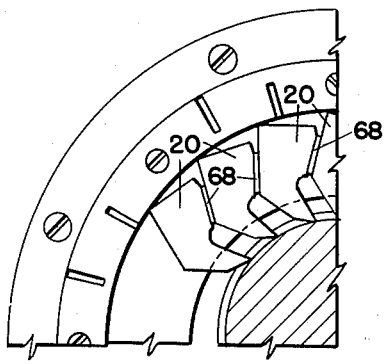
Figure 8 is a front elevation of a portion of a modification of the milling cutter of this invention for milling external threads.
Figure 9:
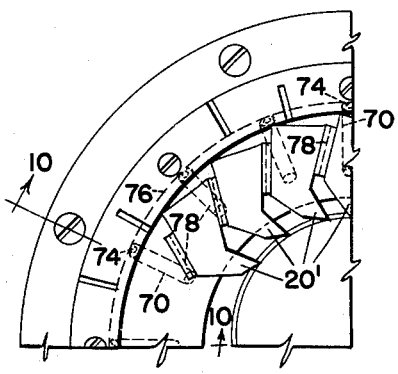
Figure 9 is a front elevation of a portion of still another modification of the external thread milling cutter.
Figure 10:
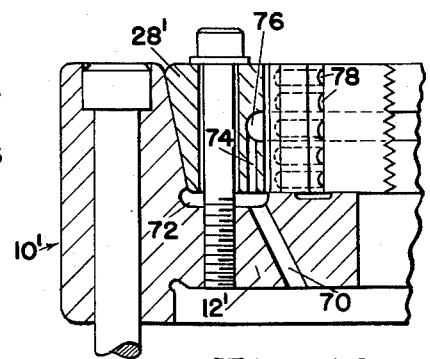
Figure 10 is a cross-sectional view of the milling cutter of Figure 9 taken along line 10—10 of Figure 9.

Figure 8 shows a milling cutter for cutting external threads which is similar to the milling cutter shown in Figures 1 and 2 with the additional feature of substantially rectangular pads 68 of a soft metal, such as lead, between the cutting teeth 20 for self-equalizing the pressure applied to the teeth. Figures 9 and 10 show a milling cutter similar to that of Figure 8 and which is provided with means for passing a coolant to the cutting teeth. The base 12' of cutter head 10' is provided with a passage 70 extending to an annular groove 72 in its inner surface. Collet ring 28' has a plurality of circumferentially spaced passages 74 extending from its inner end to an annular groove 76 in its inner surface. Each pad 68' is provided with a plurality of parallel grooves 78 extending radially from its outer edge to its inner edge. Thus, a coolant fed under pressure into passage 70 will pass into groove 72, through passages 74 into groove 76 and then through grooves 78 to the cutting teeth 20' to cool the teeth.

Figure 12:
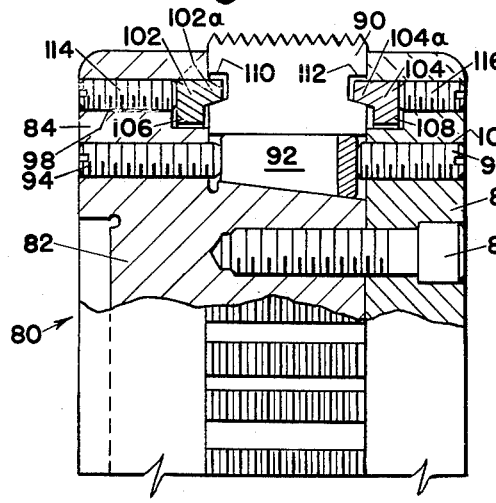
Figure 12 is a cross-sectional view of the milling cutter of Figure 11.
Figure 11:
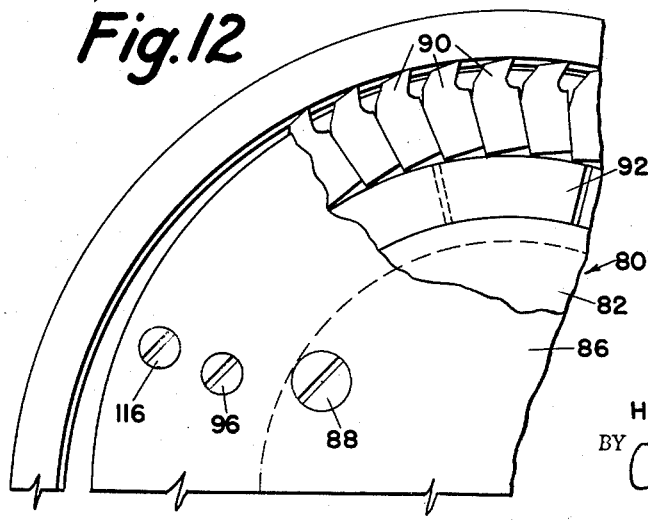
Figure 11 is a front elevation partially broken away of a portion of an internal thread milling cutter.

Figures 11 and 12 show a modification of the milling cutter for milling internal threads. The cutter head 80 is made up of a cylindrical body 82 having a radially extending flange 84 at one side and a plate 86 attached to the other side of the body 82 by screws 88. Plate 86 extends beyond body 82 parallel to flange 84 so as to form an annular channel therebetween. Milling teeth 90 similar in shape to teeth 20 of Figure 1 are arranged in side-by-side relation in the channel between flange 84 and plate 86. Teeth 90 are arranged in a complete circle with the cutting edges thereof facing outwardly. An annular collet ring 92 fits in the channel between the bottom of the teeth and the outer surface of the cutter head body 82. The inner surface of collet ring 92 is tapered to match the taper of the outer surface of body 82. Set screws 94 and 96 are threaded through holes 98 and 100 in flange 84 and plate 86 respectively and engage opposite sides of collet ring 92. By threading in set screw 96 collet ring 92 is moved out against teeth 90 to lock the teeth against each other. Set screw 94 will move collet ring 92 back to unlock teeth 90 so that the teeth can be removed for sharpening. Annular locking and adjusting rings 102 and 104 are provided in grooves 106 and 108 in the inner faces of flange 84 and plate 86 respectively. Rings 102 and 104 each have a flange 102a and 104a which project into grooves 110 and 112 in the sides of teeth 90. Flange 102a and 104a each have a tapered surface which mate with a tapered surface of grooves 110 and 112. Set screws 114 and 116 extend through flange 84 and plate 86 respectively to adjust the position of rings 102 and 104. Rings 102 and 104 permit the adjustment of teeth 90 so that their cutting edges all extend the same distance from the axis of rotation of the cutting head.

Thus, there is provided inserted teeth milling cutters, for external, internal, or face cutting, which can easily and quickly be assembled by placing the teeth in side-by-side relation within the head and then tightening the collet ring screws to contract or expand the collet ring against the teeth and thereby wedge the teeth tightly together. To sharpen the teeth the procedure is reversed to move the teeth from the head. The shape of the teeth not only permits them to be made easily and inexpensively but for resharpening purposes allows them to be arranged in such a manner that all teeth can be quickly and easily sharpened at one time as shown in Figure 4.

In addition to these advantages, the milling cutter of this invention has many other important advantages. Since the cutting teeth are mounted in side-by-side contacting relation, there are provided many more cutting edges than in previous inserted tooth milling cutters in which each tooth was individually clamped to the head. Since there are many more cutting teeth to contact with the piece 68 being worked (see Figure 1) there is increased efficiency in the cutting operation. Also, since each tooth takes a smaller cut, the cutter provides smoother machined surfaces which will in many cases eliminate the need for finish grinding.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A milling cutter comprising a cutter head having a base and an annular flange extending from said base, a plurality of identical cutting teeth mounted in side-by-side relationship against said base and within said flange and an annular collet ring between said annular flange and said cutting teeth locking said cutting teeth together within said head, each of said cutting teeth being substantially rectangular and having a flat end surface abutting said base, a flat outer surface perpendicular to said end surface, one side surface perpendicular to said end surface and said outer surface, the other side surface having at least a portion thereof tapered inwardly toward said one side surface, and the cutting edge of each of said cutting teeth being located along the inner surface thereof.

2. A milling cutter comprising a cutter head having a base and an annular flange extending from said base, the inner surface of said flange being tapered radially inwardly toward said base, a plurality of identical wedge-shaped cutting teeth mounted in a side-by-side relation against said base and within said flange, an annular collet ring between said flange and said cutting teeth, the outer surface of said collet ring being tapered to match the inner surface of said flange and screw means between said base and said clamping ring to draw said collet ring into said head and contracted around said teeth and thereby locking said teeth together, each of said cutting teeth being substantially rectangular and having a flat end surface abutting said base, a flat outer surface perpendicular to said end surface, one side surface perpendicular to said end surface and said outer surface, and the other side surface having at least a portion thereof tapered inwardly toward said one side surface, and the cutting edge of each of said cutting teeth being along the inner surface thereof.

3. A milling cutter comprising a cutter head having a base and an annular flange extending from said base, a plurality of identical cutting teeth mounted side-by-side against said base, said teeth being arranged in a circle concentric with a conical surface on said flange, an annular collet ring surrounding said circle of teeth and between said teeth and said conical surface on said flange, said ring having a conical surface mating with said conical surface on said flange, said ring having an axial cylindrical surface in abutting contact with only a corner of each of said teeth, said corner of each of said teeth being spaced from a cutting edge on each of said teeth, and screw means within the periphery of said head, said screw means extending in an axial direction and being threadedly engaged with one of said base and ring for urging said ring in an axial direction, said ring urging said teeth radially and wedgingly locking said teeth against one another.

4. A milling cutter in accordance with claim 3 wherein said collet ring has a plurality of radially extending slots therein extending alternately from the inner and outer surfaces thereof so as to increase the resiliency of said ring.

5. A milling cutter comprising a cutter head having a base and an annular flange extending from said base, a plurality of identical cutting teeth mounted side-by-side against said base, said teeth being arranged in a circle concentric with a conical surface on said flange, an annular collet ring between said teeth and said conical surface on said flange, said ring having a conical surface mating with said conical surface on said flange, said ring having an axial cylindrical surface in abutting contact with a corner of each of said teeth, said corner of each of said teeth being spaced from a cutting edge on each of said teeth, and screw means within the periphery of said head, said screw means extending in an axial direction and being threadedly engaged with one of said base and ring for urging said ring in an axial direction, said ring urging said teeth radially and wedgingly locking said teeth against one another, the cutting edge on each tooth being on an axially extending surface of each tooth.

6. A milling cutter in accordance with claim 5 wherein said ring is outside of said circle of teeth, the radial direction in which said teeth are urged by said ring being radially inwardly, and the axially extending surface on said teeth having the cutting edge being within the periphery of said annular flange.

7. A milling cutter in accordance with claim 3 including a substantially rectangular pad of soft metal between adjacent teeth for self-equalizing the pressure applied against said teeth.

8. A milling cutter comprising a cutter head having a base and an annular flange extending from said base, a plurality of identical cutting teeth mounted side-by-side against said base, said teeth being arranged in a circle concentric with a conical surface on said flange, an annular collet ring between said teeth and said conical surface on said flange, said ring having a conical surface mating with said conical surface on said flange, said ring having an axial cylindrical surface in abutting contact with a corner of each of said teeth, said corner of each of said teeth being spaced from a cutting edge on each of said teeth, and screw means within the periphery of said head, said screw means extending in an axial direction and being threadedly engaged with one of said base and ring for urging said ring in an axial direction, said ring urging said teeth radially and wedgingly locking said teeth against one another, a pad between adjacent teeth, said pads being provided with radially extending grooves, and the cutter head and collet ring having cooperating passages extending to said grooves to allow a coolant to flow therethrough to the cutting teeth.

9. A milling cutter in accordance with claim 3 wherein the cutting surface on each tooth is on a tooth surface which is parallel to the plane of said base.

10. A milling cutter comprising a cutter head having a base and a conical surface extending from the plane of the surface of said base, a plurality of identical cutting teeth mounted side-by-side against said base and in contact with one another, said teeth being arranged in a circle concentric with said conical surface, an annular collet ring between said teeth and said conical surface, said ring having a conical surface mating with said conical surface on said cutter head, said ring having an axially extending cylindrical surface in abutting contact with only a corner of each one of said teeth, said corner on each of said teeth being spaced from a cutting edge on each of said teeth, and screw means within the periphery of said head, said screw means extending in an axial direction and being threadedly engaged with one of said base and ring for urging said ring in an axial direction so that said ring urges said teeth radially and wedgingly locks said teeth against one another.

References Cited in the file of this patent

UNITED STATES PATENTS

| | | |
|---|---|---|
| 903,496 | Peck | Nov. 10, 1908 |
| 1,171,430 | Gorton | Feb. 15, 1916 |
| 1,521,467 | Morgan | Dec. 30, 1924 |
| 2,467,569 | Walters | Apr. 19, 1949 |
| 2,524,232 | Onsrud | Oct. 3, 1950 |
| 2,525,098 | Hougland | Oct. 10, 1950 |
| 2,697,271 | Phaneuf | Dec. 21, 1954 |
| 2,698,755 | Sliger | Jan. 4, 1955 |

FOREIGN PATENTS

| | | |
|---|---|---|
| 542,911 | Germany | Jan. 29, 1932 |